(12) United States Patent
Nakashima et al.

(10) Patent No.: US 10,882,561 B2
(45) Date of Patent: Jan. 5, 2021

(54) VEHICLE SIDE STRUCTURE

(71) Applicant: TOYOTA JIDOSHA KABUSHIKI KAISHA, Toyota (JP)

(72) Inventors: Mikio Nakashima, Toyota (JP); Kanichi Saito, Toyota (JP); Takaya Tsukigase, Nagoya (JP); Tsuyoshi Kato, Hekinan (JP); Kosei Ota, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 16/256,476

(22) Filed: Jan. 24, 2019

(65) Prior Publication Data

US 2019/0225276 A1    Jul. 25, 2019

(30) Foreign Application Priority Data

Jan. 24, 2018   (JP) .................................. 2018-010002
Jan. 9, 2019    (JP) .................................. 2019-001695

(51) Int. Cl.
  *B62D 25/04*   (2006.01)
  *B62D 25/02*   (2006.01)
  *B62D 21/15*   (2006.01)
  *B62D 25/20*   (2006.01)

(52) U.S. Cl.
  CPC ........... *B62D 25/04* (2013.01); *B62D 21/157* (2013.01); *B62D 25/025* (2013.01); *B62D 25/2036* (2013.01)

(58) Field of Classification Search
  CPC .... B62D 25/04; B62D 21/157; B62D 25/025; B62D 25/2036
  See application file for complete search history.

(56) References Cited

U.S. PATENT DOCUMENTS 8,226,157 B2 *   7/2012   Mackenzie ............ B62D 25/04
                                                   296/193.06
9,233,718 B2 *   1/2016   Rozario ................. B62D 25/04

FOREIGN PATENT DOCUMENTS

JP         2012-116408 A      6/2012

* cited by examiner

*Primary Examiner* — D Glenn Dayoan
*Assistant Examiner* — Melissa Ann Bonifazi
(74) *Attorney, Agent, or Firm* — Oliff PLC

(57) ABSTRACT

A vehicle side structure includes a reinforcement extending upward from a rear wheel well, a side outer panel placed outward of the rear wheel well and the reinforcement in the vehicle width direction, a striker configured to lock a rear side door, and a bracket to which the striker is attached. An engaged portion is provided in the reinforcement, the striker is placed on an outer side of the side outer panel, and the bracket is provided with an engaging portion configured to engage with the engaged portion.

12 Claims, 14 Drawing Sheets

VEHICLE SIDE STRUCTURE

INCORPORATION BY REFERENCE

The disclosure of Japanese Patent Application No. 2018-010002 filed on Jan. 24, 2018 including the specification, drawings and abstract is incorporated herein by reference in its entirety.

BACKGROUND

1. Technical Field

The disclosure relates to a vehicle side structure.

2. Description of Related Art

There has been known a vehicle side structure including a rear wheel well and a roof side outer reinforcement extending upward from the rear wheel well (for example, see Japanese Unexamined Patent Application Publication No. 2012-116408 (JP 2012-116408 A)).

The rear wheel well includes a wheel well outer panel and a wheel well inner panel. The wheel well outer panel includes a flange portion constituting a vehicle body side wall, and an outer cover portion extending outwardly in the vehicle width direction from the flange portion. A roof side inner panel is provided above the flange portion. The outer cover portion is formed in a generally semi-arc shape along the outer periphery of a rear wheel, when it is viewed from the vehicle width direction.

The roof side outer reinforcement has a generally hat-shaped section and is formed so as to extend in the up-down direction. The roof side outer reinforcement is placed outwardly, in the vehicle width direction, from the flange portion of the wheel well outer panel and the roof side inner panel, and the roof side outer reinforcement is joined to the flange portion and the roof side inner panel. A lower end of the roof side outer reinforcement is joined to an upper end of the outer cover portion of the wheel well outer panel.

A bracket for reinforcement is provided in front of the lower end of the roof side outer reinforcement in the vehicle front-rear direction. The bracket is joined to the flange portion and the outer cover portion of the wheel well outer panel and to the roof side outer reinforcement. The bracket has an attachment surface to which a striker for locking a rear side door is attached. A side outer panel constituting an outer plate of the vehicle is provided outwardly, in the vehicle width direction, from the wheel well outer panel, the roof side outer reinforcement, and the bracket.

SUMMARY

Here, in the above vehicle side structure, at the time of a side collision, a collision load input into the rear side door is transmitted to the roof side outer reinforcement via the bracket, so that it is possible to restrain the rear side door from entering a cabin. However, since the bracket is joined to the roof side outer reinforcement, a high dimension accuracy is demanded.

The disclosure provides a vehicle side structure that is able to suppress such a situation that a high dimension accuracy is demanded and to restrain a rear side door from entering a cabin at the time of a side collision.

A first aspect of the present disclosure relates to a vehicle side structure. The vehicle side structure includes a reinforcement, a side outer panel, a striker, and a bracket. The reinforcement extends upward from a rear wheel well and is provided with an engaged portion. The side outer panel is placed outward of the rear wheel well and the reinforcement in the vehicle width direction. The striker is placed on an outer side of the side outer panel so as to lock a rear side door. The bracket is placed inside the side outer panel such that the striker is attached to the bracket. The bracket is provided with an engaging portion configured to engage with the engaged portion.

In the first aspect, the engaging portion may be engaged with the engaged portion at the time of a side collision.

In the above configuration, at the time of a side collision, the engaging portion of the bracket is engaged with the engaged portion of the reinforcement, so that a collision load input into the rear side door is transmitted to the reinforcement via the bracket. Accordingly, it is possible to restrain the rear side door from entering a cabin. Further, since the bracket is not joined to the reinforcement, it is possible to suppress such a situation that a high dimensional accuracy is demanded.

In the first aspect, one of the engaging portion and the engaged portion may be a projection extending in the vehicle width direction, the other one of the engaging portion and the engaged portion may be a hole portion, and the projection may be inserted into the hole portion.

With the above configuration, the engaging portion can be appropriately engaged with the engaged portion at the time of a side collision. Further, in a case where the projection is not inserted into the hole portion at the time of assembling of the side outer panel, the projection interferes with the bracket or the reinforcement, so that the side outer panel is raised. As a result, the side outer panel cannot be assembled. This accordingly can promote the side outer panel to be assembled in an appropriate state where the projection is inserted into the hole portion.

In the first aspect, the projection may be distanced from the hole portion.

With the above configuration, it is possible to restrain the projection from making contact with the hole portion during vehicle running, thereby making it possible to restrain occurrence of abnormal noise. Further, since the projection is easily inserted into the hole portion, it is possible to easily perform an assembling operation of the side outer panel. Further, by adjusting a distance between the projection and the hole portion, it is possible to adjust the timing when a vertical wall in a rear end of the rear side door is pulled rearward in the vehicle front-rear direction at the time of a side collision.

In the first aspect, the bracket may be provided with a rod, the hole portion may be provided in the reinforcement, a front side of the rod in the vehicle front-rear direction may be attached to the bracket, and a rear side of the rod in the vehicle front-rear direction may be inserted into the hole portion.

With the above configuration, a collision load at the time of a side collision can be transmitted appropriately by the rod.

In the first aspect, the bracket may include a first face portion to which the striker is attached and a second face portion extending rearward in the vehicle front-rear direction from the first face portion, and the rod may be attached to the first face portion and the second face portion.

With the above configuration, at the time of a side collision, it is possible to suppress such a situation that the bracket deforms so that an angle between the first face portion and the second face portion changes. That is, it is possible to restrain the bracket from bending at a boundary portion between the first face portion and the second face portion. This makes it possible to restrain an increase of an entry amount of the rear side door due to the deformation of the bracket.

In the first aspect, the bracket may include a first face portion to which the striker is attached, a second face portion extending rearward in the vehicle front-rear direction from the first face portion, and a third face portion extending inwardly in the vehicle width direction from the second face portion. The reinforcement may be provided with the hole portion into which the third face portion is inserted.

With the above configuration, it is possible to increase a contact area between the engaging portion and the engaged portion at the time of a side collision, thereby making it possible to disperse a collision load transmitted to the engaged portion (the hole portion).

In the first aspect, a bead portion may be formed in the second face portion and the third face portion.

With the above configuration, it is possible to improve strength of the second face portion and the third face portion, thereby making it possible to restrain the bracket from deforming at the time of a side collision.

In the first aspect, the bracket may include a first plate material, and a second plate material having a thickness thicker than a thickness of the first plate material, the first face portion and the second face portion may be made of the first plate material, and the second face portion and the third face portion may be made of the second plate material.

With the above configuration, it is possible to restrain an increase in weight of the bracket and to improve strength of the third face portion, thereby making it possible to restrain the bracket from deforming at the time of a side collision.

In the first aspect, the reinforcement may be provided with an extension that is a separate portion from the reinforcement, and the hole portion may be provided in the extension.

With the above configuration, it is possible to restrain a decrease in strength of the reinforcement and to provide the hole portion in the reinforcement.

In the first aspect, the hole portion may be provided in the bracket, and the projection may be provided in the reinforcement.

In the above configuration, it is not necessary to form the hole portion in the reinforcement, thereby making it possible to restrain a decrease in strength of the reinforcement.

In the first aspect, a burring portion may be formed around the hole portion.

With the above configuration, it is possible to restrain the hole portion from deforming at the time of a side collision.

In the first aspect, a reinforcement patch may be provided around the hole portion.

With the above configuration the thickness around the hole portion can be increased, thereby making it possible to restrain the hole portion from deforming at the time of a side collision.

With the first aspect of the disclosure, it is possible to suppress such a situation that a high dimension accuracy is demanded and to restrain the rear side door from entering the cabin at the time of a side collision.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

With reference to the drawings, descriptions are now made of a first embodiment of the disclosure (a present embodiment of the disclosure).

Figure 1:
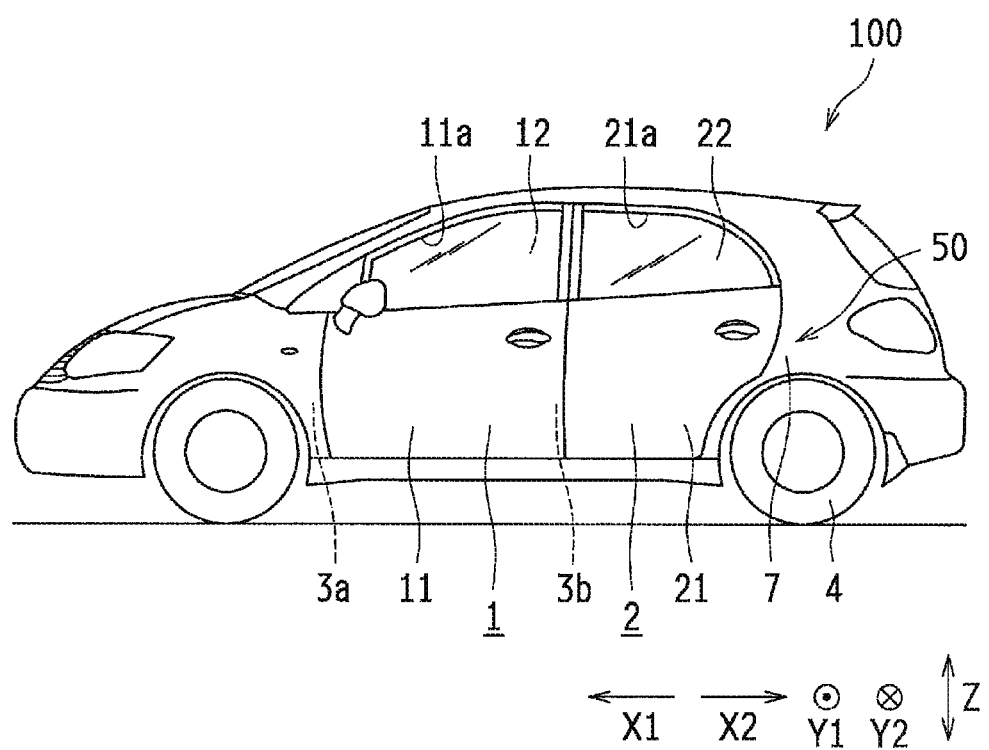
FIG. 1 is a side view illustrating one example of a vehicle to which a vehicle side structure according to the present embodiment is applied.

First, with reference to FIG. 1, the following describes a vehicle 100 to which a vehicle side structure 50 according to the first embodiment of the disclosure is applied.

As illustrated in FIG. 1, the vehicle 100 includes front side door openings (not shown) and rear side door openings 2*a* (see FIG. 2) provided on both sides of a cabin (not shown), and the vehicle 100 is provided with front side doors 1 for opening and closing the front side door openings and rear side doors 2 for opening and closing the rear side door openings 2*a*. That is, a pair of the front side doors 1 and a pair of the rear side doors 2 are provided such that one of the front side doors 1 and one of the rear side doors 2 are provided on the right end of the vehicle 100 in the vehicle width direction (toward Y1 and Y2 sides) and the other one of the front side doors 1 and the other one of the rear side doors 2 are provided on the left end of the vehicle 100 in the vehicle width direction. The front side door 1 and the rear side door 2 on each side are placed so as to be adjacent to each other in the vehicle front-rear direction (toward X1 and X2 sides).

The front side door 1 includes a door main body 11 having a window opening 11*a*, a door glass 12 for opening and closing the window opening 11*a*, and a window regulator (not shown) for moving the door glass 12 up and down. The door main body 11 is formed in a box shape by a door outer panel and a door inner panel, and the window regulator, a locking mechanism (not shown), and the like are accommodated in an internal space thereof. A front end of the door main body 11 is connected to an A-pillar 3*a* via a hinge (not shown). The locking mechanism is placed in a rear end of the door main body 11 and is configured to be configured to engage with a striker (not shown) provided in a B-pillar 3b. When the locking mechanism is engaged with the striker, a state where the front side door 1 closes the front side door opening is maintained.

The rear side door 2 includes a door main body 21 having a window opening 21a, a door glass 22 for opening and closing the window opening 21a, and a window regulator (not shown) for moving the door glass 22 up and down. The door main body 21 is formed in a box shape by a door outer panel and a door inner panel, and the window regulator, a locking mechanism 23 (see FIG. 4), and the like are accommodated in an internal space thereof. A front end of the door main body 21 is connected to the B-pillar 3b via a hinge (not shown). The locking mechanism 23 is placed in a rear end of the door main body 21 and is configured to be configured to engage with a striker 8 (see FIG. 4) that will be described later. When the locking mechanism 23 is engaged with the striker 8, a state where the rear side door 2 closes the rear side door opening 2a is maintained.

Vehicle side structures 50 are provided above rear wheels 4 of the vehicle 100. The vehicle side structures 50 are provided as a pair such that one of the vehicle side structures 50 is provided on the right end of the vehicle 100 in the vehicle width direction and the other one of the vehicle side structures 50 is provided on the left end of the vehicle 100 in the vehicle width direction.

Vehicle Side Structure

Next will be described the vehicle side structure 50 according to the present embodiment with reference to FIGS. 2 to 4. Note that the following description deals with the left vehicle side structure 50 out of the vehicle side structures 50. Since the right vehicle side structure 50 is configured similarly to the left vehicle side structure 50, its description will be omitted.

Figure 2:
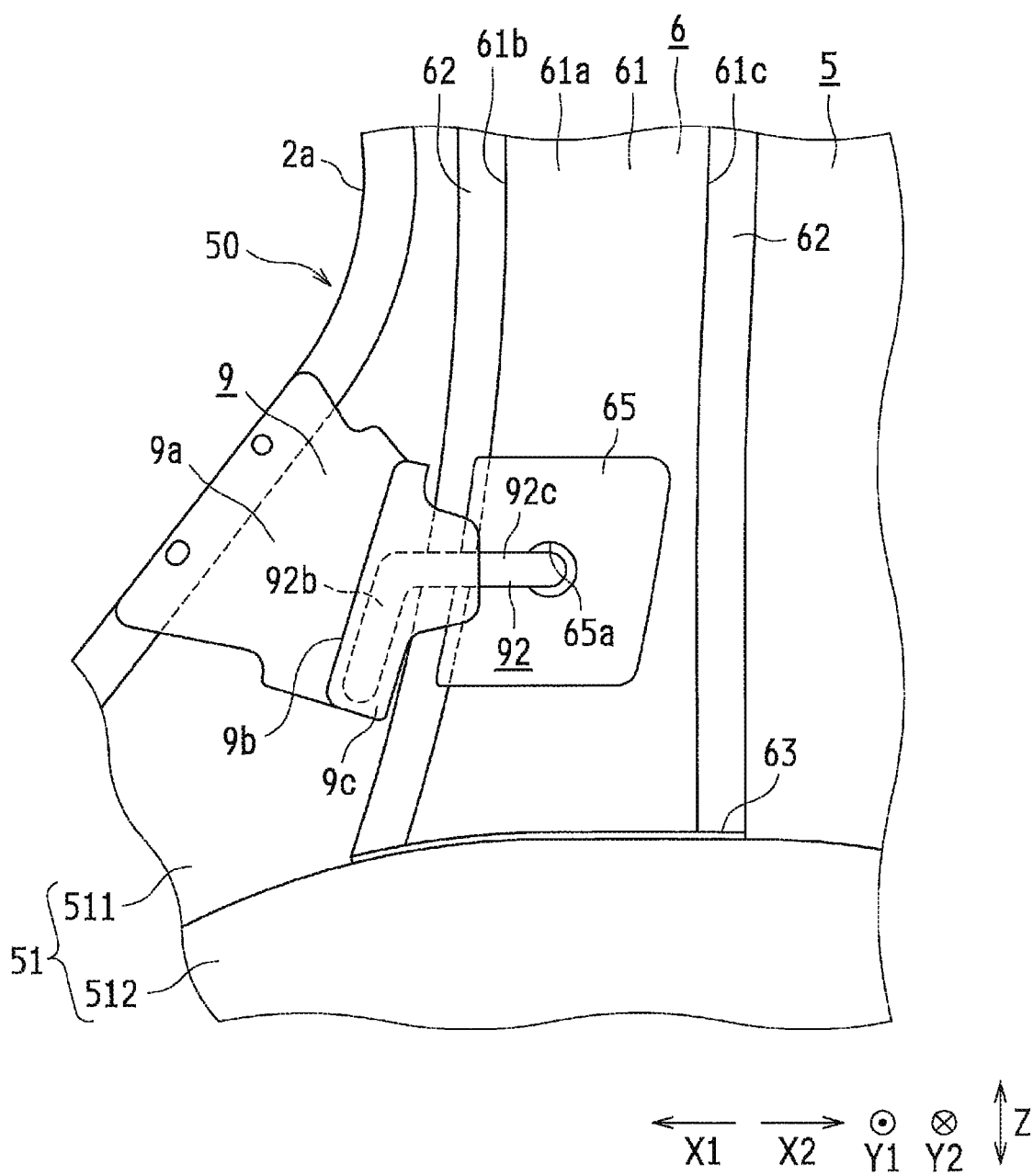
FIG. 2 is a side view illustrating the vehicle side structure according to the present embodiment.
Figure 3:
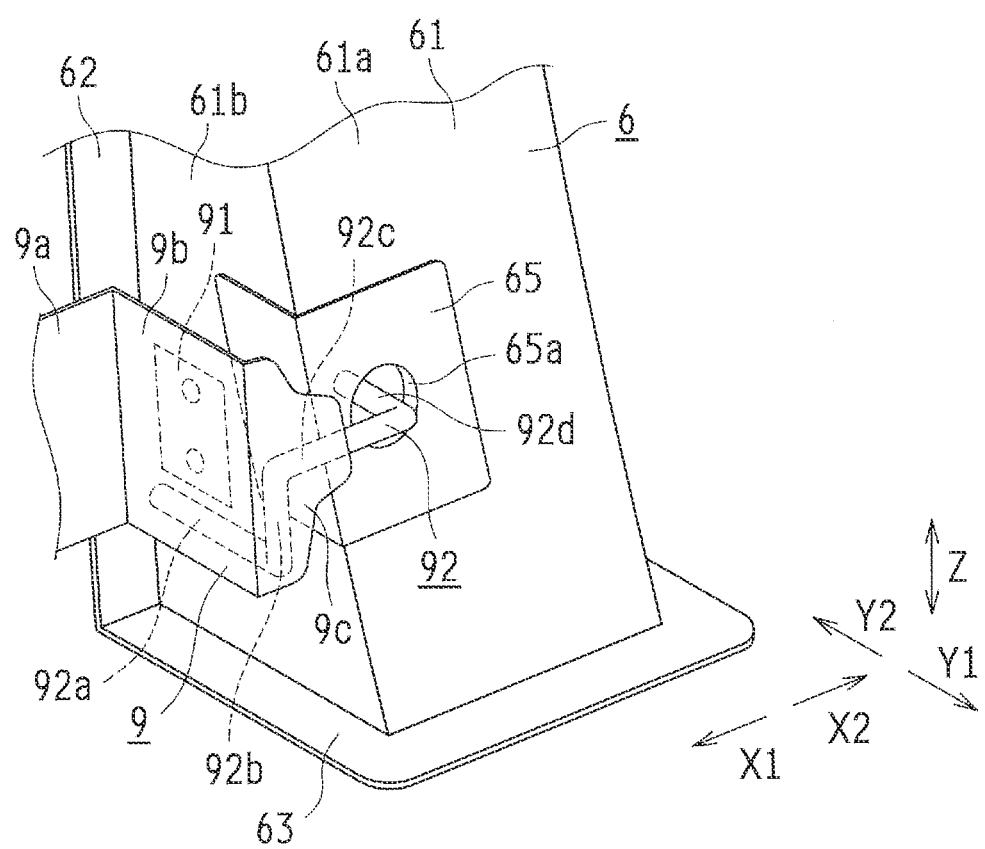
FIG. 3 is a perspective view illustrating a bracket and a rod of the vehicle side structure of FIG. 2.
Figure 4:
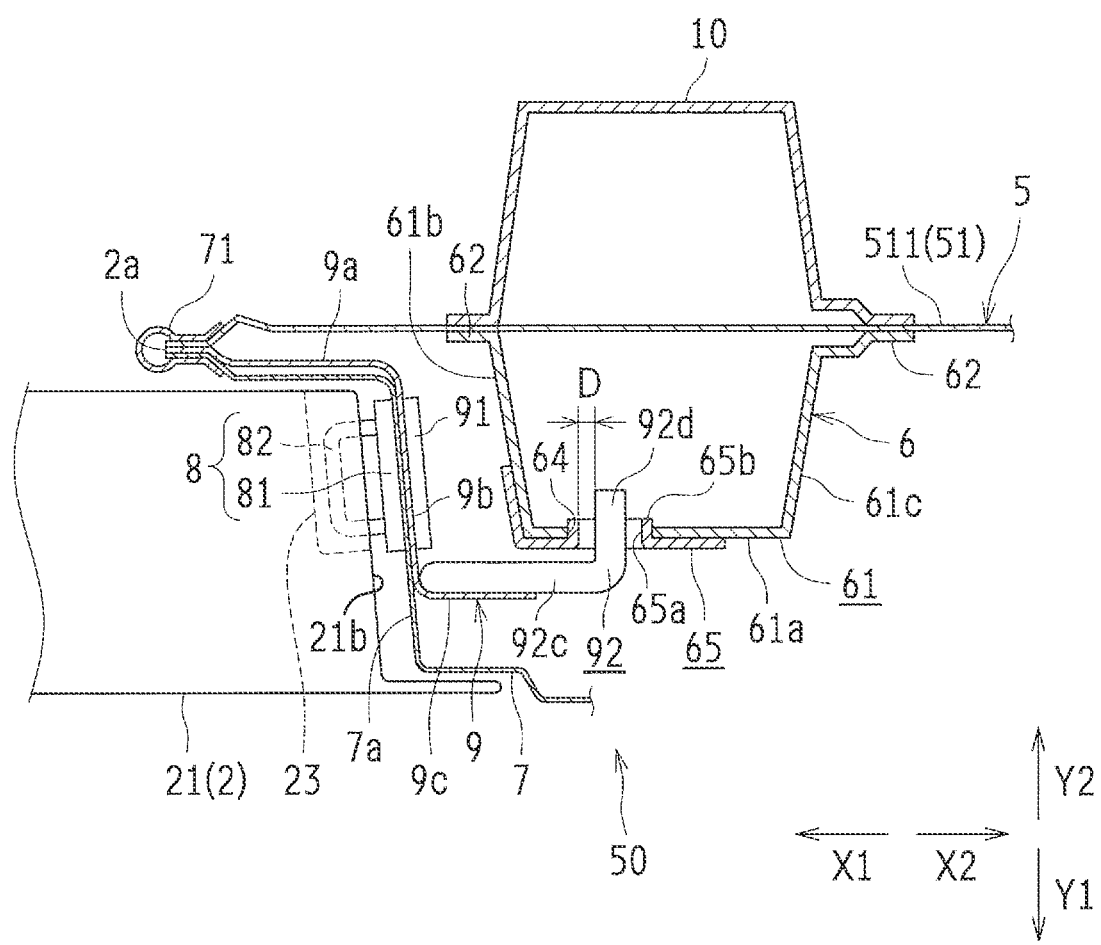
FIG. 4 is a sectional view to describe the vehicle side structure of FIG. 2.

As illustrated in FIGS. 2 to 4, the vehicle side structure 50 includes a rear wheel well 5 (see FIG. 2), a roof side outer reinforcement 6, a side outer panel 7 (see FIG. 4), a striker 8 (see FIG. 4), and a bracket 9. Note that, in FIG. 2, the side outer panel 7 and the striker 8 are not illustrated, and in FIG. 3, the rear wheel well 5, the side outer panel 7, and the striker 8 are not illustrated. Further, the roof side outer reinforcement 6 is one example of a "reinforcement" in the disclosure.

As illustrated in FIG. 2, the rear wheel well 5 includes a wheel well outer panel 51 and a wheel well inner panel (not shown) and is configured to cover the upper side of the rear wheel 4 (see FIG. 1).

The wheel well outer panel 51 includes a flange portion 511 constituting a vehicle body side wall, and an outer cover portion 512 extending outwardly (toward the Y1 side) in the vehicle width direction from the flange portion 511. The flange portion 511 is placed so as to intersect with the vehicle width direction. A roof side inner panel (not shown) constituting the vehicle body side wall is provided above the flange portion 511 along the flange portion 511. Front ends (on the X1 side), in the vehicle front-rear direction, of the flange portion 511 and the roof side inner panel constitute a part of an edge of the rear side door opening 2a. The outer cover portion 512 is formed in a generally semi-arc shape along the outer periphery of the rear wheel 4, when it is viewed from the vehicle width direction.

The wheel well inner panel includes an inner cover portion and a vertical wall portion. The inner cover portion is formed so as to extend inwardly (toward the Y2 side) in the vehicle width direction from a boundary portion between the flange portion 511 and the outer cover portion 512 and is formed in a generally semi-arc shape along the outer periphery of the rear wheel 4, when it is viewed from the vehicle width direction. The vertical wall portion is placed in an inner end, in the vehicle width direction, of the inner cover portion and is formed in a generally semicircular shape when it is viewed from the vehicle width direction.

The roof side outer reinforcement 6 is placed outwardly, in the vehicle width direction, from the flange portion 511 of the wheel well outer panel 51 and the roof side inner panel and is also placed above the outer cover portion 512 of the wheel well outer panel 51. The roof side outer reinforcement 6 includes a body portion 61 extending in the up-down direction (a Z-direction) and flange portions 62, 63, as illustrated in FIG. 3.

The body portion 61 is formed to have a generally U-shaped section and is placed so that its open end faces inwardly in the vehicle width direction. The body portion 61 includes a side face 61a, a front face 61b extending inwardly in the vehicle width direction from a front end of the side face 61a in the vehicle front-rear direction, and a rear face 61c extending inwardly in the vehicle width direction from a rear end (on the X2 side) of the side face 61a in the vehicle front-rear direction (see FIG. 4). The flange portion 62 is formed so as to extend to a side distanced from the open end of the body portion 61 and is joined to the flange portion 511 of the wheel well outer panel 51 and the roof side inner panel. The flange portion 63 is formed in a lower end of the body portion 61 and is joined to an upper end of the outer cover portion 512 of the wheel well outer panel 51.

That is, the roof side outer reinforcement 6 is configured so as to extend upward in the up-down direction from the upper end of the outer cover portion 512. A closed section is formed by the roof side outer reinforcement 6, the wheel well outer panel 51, and the roof side inner panel.

Further, as illustrated in FIG. 4, a roof side inner reinforcement 10 is provided inward of the roof side outer reinforcement 6 in the vehicle width direction. The roof side inner reinforcement 10 is joined to the flange portion 511 of the wheel well outer panel 51 and to the wheel well inner panel. A closed section is formed by the roof side inner reinforcement 10 and the wheel well 5.

The side outer panel 7 is placed outwardly, in the vehicle width direction, from the wheel well 5 and the roof side outer reinforcement 6 so as to constitute an outer plate of the vehicle 100. The side outer panel 7 has a striker placement surface 7a on which the striker 8 is placed. The striker placement surface 7a is placed so as to intersect with the vehicle front-rear direction and is placed with a distance from the front face 61b of the roof side outer reinforcement 6. The side outer panel 7 is joined to a front end, in the vehicle front-rear direction, of the flange portion 511 of the wheel well outer panel 51. On this account, a front end, in the vehicle front-rear direction, of the side outer panel 7 constitutes a part of the edge of the rear side door opening 2a. Note that a weather strip 71 is mounted to a peripheral edge of the rear side door opening 2a.

The striker 8 is provided so as to lock the rear side door 2 and is configured such that the locking mechanism 23 of the rear side door 2 is configured to engage with the striker 8. The striker 8 includes a base plate 81 and a U-shaped striker body 82 formed in the base plate 81. The striker 8 is placed on an outer side of the side outer panel 7, and the base plate 81 is placed along the striker placement surface 7a. Hereby, the striker body 82 is placed in front of the base plate 81 in the vehicle front-rear direction, so that the locking mechanism 23 is configured to engage with the striker body 82.

The vehicle side structure 50 of the present embodiment is provided with a structural portion functioning at the time of a side collision. More specifically, the vehicle side structure 50 is configured to transmit, to the roof side outer reinforcement 6, a collision load input into the rear side door 2 at the time of a side collision.

Structural Portion for Side Collision

Next will be described the structural portion functioning at the time of a side collision in the vehicle side structure 50 according to the present embodiment with reference to FIGS. 2 to 4.

As illustrated in FIG. 4, a circular hole portion 64 into which a rod 92 (described later) is inserted is formed on the side face 61a in the vicinity of a lower end of the roof side outer reinforcement 6. Further, a reinforcement patch 65 is provided around the hole portion 64 of the roof side outer reinforcement 6. The reinforcement patch 65 is an L-shaped plate and is joined to the side face 61a and the front face 61b of the roof side outer reinforcement 6. A circular hole portion 65a is formed in the reinforcement patch 65 at a position corresponding to the hole portion 64, and a burring portion 65b is formed around the hole portion 65a. The burring portion 65b is an annular projecting portion (flange portion) formed in a peripheral edge of the hole portion 65a. The burring portion 65b is formed so as to project inwardly (toward the Y2 side) in the vehicle width direction and is placed inside the hole portion 64. That is, the burring portion 65b is fitted to the hole portion 64. Note that the hole portion 65a is one example of an "engaged portion" in the disclosure.

A retainer 91 that holds the striker 8 is attached to the bracket 9, and the rod 92 inserted into the hole portion 65a is also attached to the bracket 9. For example, the thickness of the bracket 9 is 1.2 mm and the diameter of the rod 92 is 16 mm. The bracket 9 is placed inside the side outer panel 7 and is joined to the side outer panel 7. The bracket 9 is a plate formed in a generally Z-shape and has three face portions 9a to 9c.

The face portion 9a is formed so as to extend in the vehicle front-rear direction and is placed between the flange portion 511 of the wheel well outer panel 51 and the side outer panel 7. A front end (on the X1 side) of the face portion 9a in the vehicle front-rear direction is joined in a state where it is sandwiched between the flange portion 511 and the side outer panel 7. The face portion 9b is formed in a rear end (on the X2 side) of the face portion 9a in the vehicle front-rear direction so as to extend outwardly (toward the Y1 side) in the vehicle width direction. The face portion 9b is placed along the striker placement surface 7a of the side outer panel 7, and the retainer 91 is attached to the face portion 9b. The base plate 81 of the striker 8 is fixed to the retainer 91 with a fastening member (not shown) such as a bolt. The face portion 9c is formed in an outer end of the face portion 9b in the vehicle width direction so as to extend rearward in the vehicle front-rear direction. The face portion 9c is placed outwardly in the vehicle width direction from the side face 61a of the roof side outer reinforcement 6. The rod 92 is attached to the face portions 9b and 9c. Note that the face portions 9b and 9c are examples of a "first face portion" and a "second face portion" in the disclosure, respectively.

A front side of the rod 92 in the vehicle front-rear direction is attached to the bracket 9 and a rear side of the rod 92 in the vehicle front-rear direction is inserted into the hole portion 65a. More specifically, the rod 92 is a round bar in which three bending portions are formed as illustrated in FIG. 3 and includes four bar portions 92a to 92d.

The bar portion 92a is formed so as to extend in the vehicle width direction and is attached to the face portion 9b of the bracket 9. The bar portion 92a is placed below the retainer 91. The bar portion 92b is formed in an outer end of the bar portion 92a in the vehicle width direction so as to extend upward. The bar portion 92b is formed so as to extend along a boundary portion between the face portions 9b and 9c and is attached to the boundary portion. The bar portion 92b and the face portion 9b (see FIG. 2) are slightly inclined so that their upper ends are placed rearward in the vehicle front-rear direction from their lower ends. The bar portion 92c is formed in an upper end of the bar portion 92b so as to extend rearward in the vehicle front-rear direction. A front side of the bar portion 92c in the vehicle front-rear direction is attached to the face portion 9c. The bar portion 92c is placed outwardly in the vehicle width direction from the side face 61a of the roof side outer reinforcement 6. The bar portion 92d is formed in a rear end of the bar portion 92c in the vehicle front-rear direction so as to extend inwardly in the vehicle width direction. The bar portion 92d is inserted into the hole portion 65a of the roof side outer reinforcement 6.

That is, the rod 92 is formed in a hook shape such that the rod 92 extends rearward in the vehicle front-rear direction from the bracket 9 and bends inwardly in the vehicle width direction. That is, a rear side of the rod 92 in the vehicle front-rear direction is formed in an L-shape and the bar portion 92d projecting inwardly in the vehicle width direction is inserted into the hole portion 65a. Accordingly, at the time of a side collision, the bar portion 92d of the rod 92 is engaged with the hole portion 65a of the roof side outer reinforcement 6. Note that the bar portion 92d is one example of an "engaging portion" and a "projection" in the disclosure.

Here, the diameter of the hole portion 65a is larger than the diameter of the bar portion 92d, so that the bar portion 92d is distanced from the hole portion 65a. That is, the bar portion 92d inserted into the hole portion 65a does not make contact with the hole portion 65a. A distance D (see FIG. 4) between a forwardmost part of the hole portion 65a in the vehicle front-rear direction and a forwardmost part of the bar portion 92d in the vehicle front-rear direction is a value set in advance. By adjusting the distance D, it is possible to adjust the timing when a vertical wall 21b (see FIG. 4) in a rear end of the rear side door 2 is pulled rearward in the vehicle front-rear direction at the time of a side collision. The distance D is, for example, set such that a load is applied to the vertical wall 21b during an after-mentioned period T2 (see FIG. 6) so that an entry speed of a rear part of the rear side door 2 in the vehicle front-rear direction is decreased.

Operation Example at Side Collision

Figure 5:
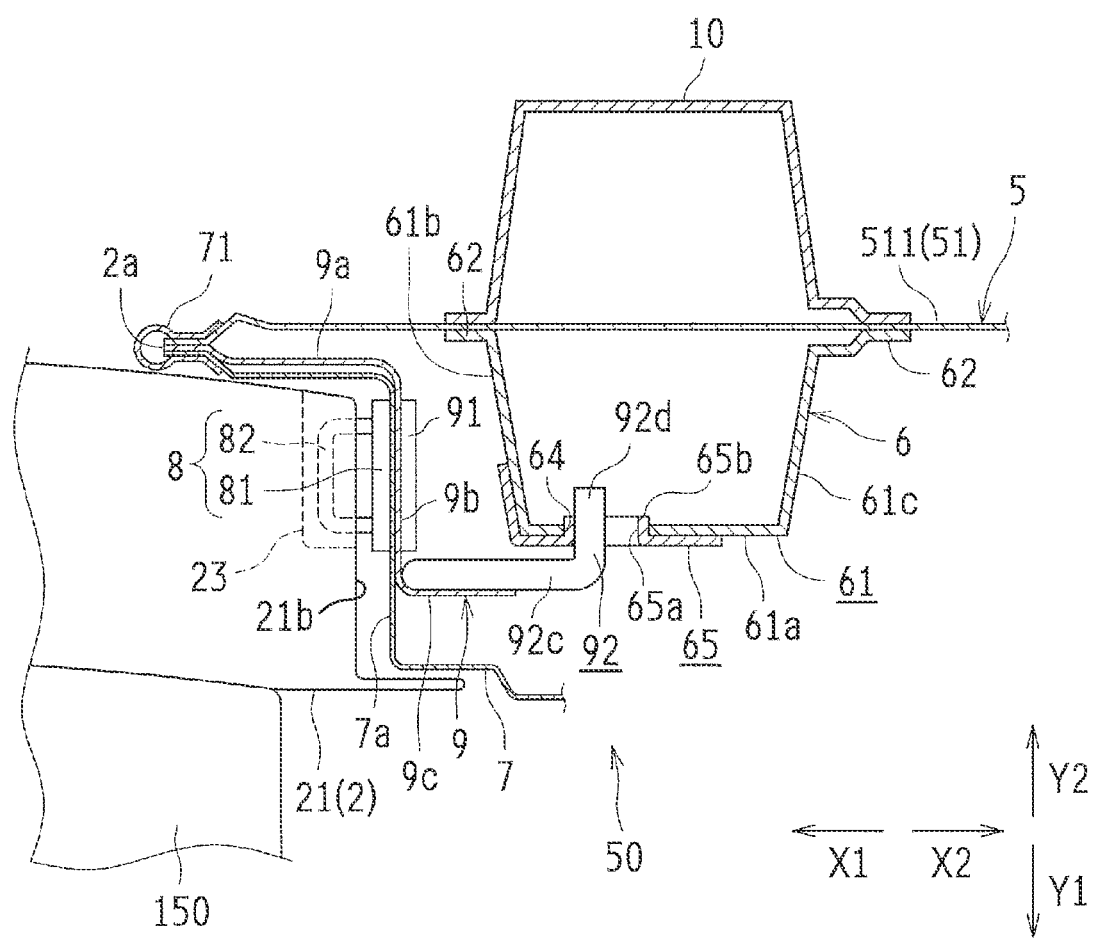
FIG. 5 is a sectional view to describe an operation example at the time of a side collision in the vehicle side structure according to the present embodiment.

Next will be described an operation example at the time of a side collision in the vehicle side structure 50 according to the present embodiment with reference to FIG. 5.

When a collision object 150 collides with a side face of the vehicle 100, the collision object 150 is brought into contact with a front part of the rear side door 2 in the vehicle front-rear direction. The collision object 150 is, for example, a moving deformable barrier (MDB) that imitates a vehicle. On this account, the front part of the rear side door 2 in the vehicle front-rear direction is pushed, by the collision object 150, inwardly in the vehicle width direction, and along with this, the rear part of the rear side door 2 in the vehicle front-rear direction is pulled forward in the vehicle front-rear direction. At this time, since the locking mechanism 23 of the rear side door 2 is engaged with the striker 8, the bracket 9 is pulled forward in the vehicle front-rear direction by the rear side door 2 as illustrated in FIG. 5, so that the bar portion 92d of the rod 92 is engaged with the hole portion 65a of the roof side outer reinforcement 6. Hereby, a collision load input into the rear side door 2 is transmitted to the roof side outer reinforcement 6 via the bracket 9 and the rod 92. That is, the collision load input into the rear side door 2 can be partially borne by the roof side outer reinforcement 6. Accordingly, it is possible to restrain the rear side door 2 from entering the cabin.

Further, at the time of a side collision, when the rear part of the rear side door 2 in the vehicle front-rear direction is moved forward in the vehicle front-rear direction while the front part of the rear side door 2 in the vehicle front-rear direction is pushed inwardly in the vehicle width direction, the bar portion 92d of the rod 92 is engaged with the hole portion 65a of the roof side outer reinforcement 6, and the vertical wall 21b in the rear end of the rear side door 2 is pulled rearward in the vehicle front-rear direction by the roof side outer reinforcement 6, so that the door inner panel is to approach the door outer panel side (the Y1 side) in the rear part of the rear side door 2 in the vehicle front-rear direction. This accordingly makes it possible to further restrain the rear part of the rear side door 2 in the vehicle front-rear direction from entering the cabin. Note that, when the vertical wall 21b in the rear side door 2 is pulled rearward in the vehicle front-rear direction by the roof side outer reinforcement 6, the front part of the rear side door 2 in the vehicle front-rear direction is pushed, by the collision object 150, inwardly in the vehicle width direction, and the rear part of the rear side door 2 in the vehicle front-rear direction is inclined from the vehicle front-rear direction such that a rear end in the vehicle front-rear direction is placed outward in the vehicle width direction. That is, the rear part of the rear side door 2 in the vehicle front-rear direction is inclined such that the front part in the vehicle front-rear direction is placed inward in the vehicle width direction.

Speed Change of Rear Side Door at Side Collision

Next will be described a speed change of the rear side door 2 at the time of a side collision in the vehicle side structure 50 according to the present embodiment with reference to FIG. 6. Note that, in FIG. 6, the speed change of the rear side door 2 at the time of a side collision in the vehicle side structure 50 according to the present embodiment is illustrated and a speed change of a rear side door at the time of a side collision in a vehicle side structure of a comparative example in which the structural portion functioning at the time of a side collision is not provided is also illustrated. In the following description, a speed change of a rear side door at the time of a side collision in a vehicle side structure according to a comparative example will be described first, and then, a speed change of the rear side door 2 at the time of a side collision in the vehicle side structure 50 according to the present embodiment will be described.

Speed Change in Comparative Example

Figure 6:
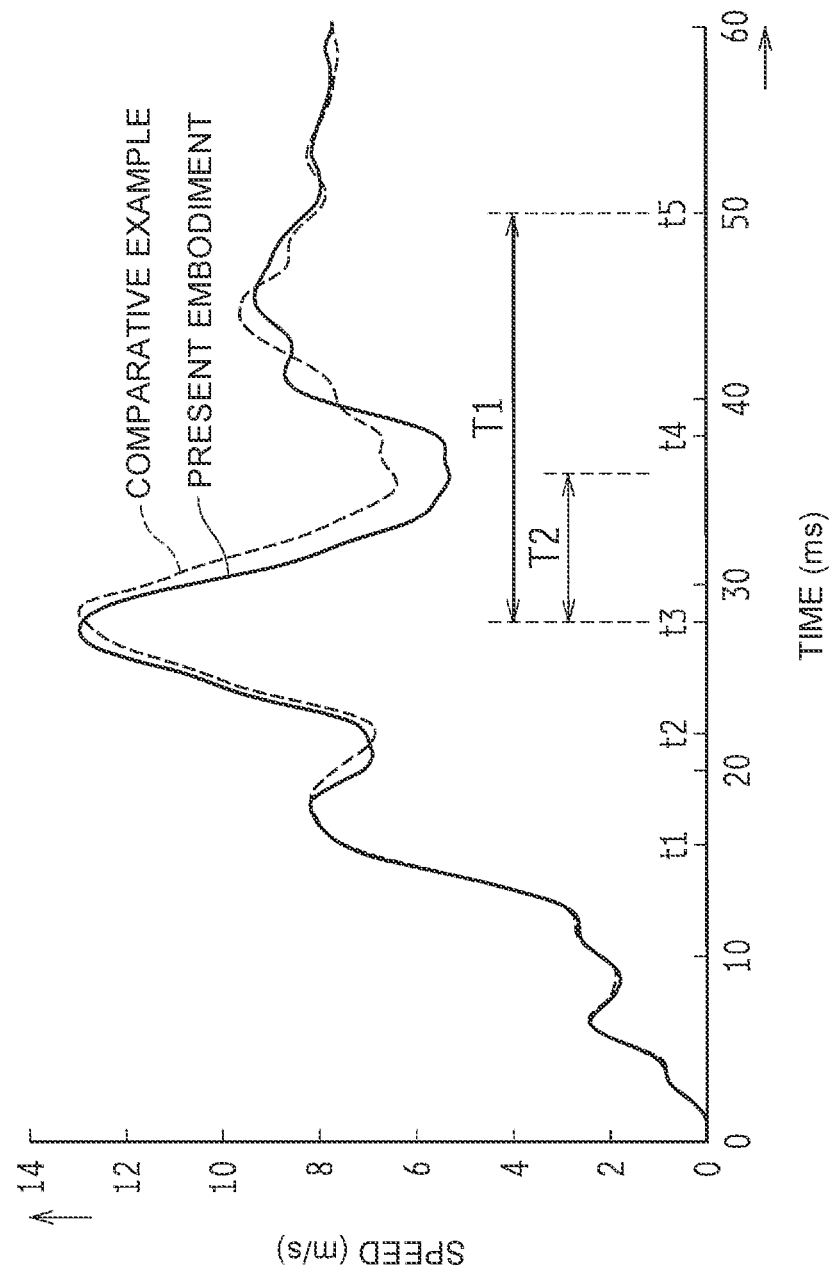
FIG. 6 is a graph illustrating one example of a speed change of a rear side door at the time of a side collision.

As illustrated in FIG. 6, in the vehicle side structure of the comparative example, at the time of a side collision, the speed of the rear side door toward the inner side in the vehicle width direction increases due to input from a collision object. At time t1, the rear side door pushed by a collision object to move inwardly in the vehicle width direction hits a rear seat inside a cabin, so that the speed of the rear side door is decreased.

Then, at time t2, a door outer panel and a door inner panel in a front part of the rear side door in the vehicle front-rear direction strike against the bottom (are crushed completely), so that the speed of the rear side door is increased. After that, the speed of the rear side door is decreased at time t3.

Subsequently, at time t4, a B-pillar supporting the rear side door is deformed, so that the speed of the rear side door is increased. Then, deformations of the vehicle and the collision object are finished at time t5, so that the speed of the rear side door (the vehicle) reaches the same speed as the collision object.

Here, a period T1 from time t3 to time t5 is a period during which the rear side door entering the cabin side at the time of a side collision largely affects the cabin. On this account, it is desired to decrease the speed of the rear side door 2 during the period T1.

Speed Change in Present Embodiment

In the vehicle side structure 50 according to the present embodiment, at the time of a side collision, the speed of the rear side door 2 toward the inside in the vehicle width direction increases due to input from the collision object 150. Then, at time t1, the rear side door 2 pushed by the collision object 150 to move inwardly in the vehicle width direction hits a rear seat inside the cabin, so that the speed of the rear side door 2 is decreased.

Then, at time t2, the door outer panel and the door inner panel in the front part of the rear side door 2 in the vehicle front-rear direction strike against the bottom, so that the speed of the rear side door 2 is increased. Further, the rear part of the rear side door 2 in the vehicle front-rear direction is moved forward in the vehicle front-rear direction, so that the bar portion 92d of the rod 92 starts to be engaged with the hole portion 65a of the roof side outer reinforcement 6. After that, the speed of the rear side door 2 is decreased at time t3.

Here, in the present embodiment, during the period T2 from time t3, the vertical wall 21b in the rear end of the rear side door 2 is pulled rearward in the vehicle front-rear direction by the roof side outer reinforcement 6, so that the door inner panel is to approach the door outer panel side in the rear part of the rear side door 2 in the vehicle front-rear direction. Hereby, in the vehicle side structure 50 of the present embodiment, the speed of the rear side door 2 is decreased as compared with the comparative example.

Subsequently, at time t4, the B-pillar 3b supporting the rear side door 2 is deformed, so that the speed of the rear side door 2 is increased. Then, deformations of the vehicle 100 and the collision object 150 are finished at time t5, so that the speed of the rear side door 2 (the vehicle 100) reaches the same speed as the collision object 150.

Strictly speaking, time t1 to time t5 in the comparative example and time t1 to time t5 in the present embodiment in FIG. 6 are different from each other but are almost the same timings. For example, time t1 is a time point at which 16 msec pass from a collision start, time t2 is a time point at which 22 msec pass from the collision start, time t3 is a time point at which 28 msec pass from the collision start, time t4 is a time point at which 38 msec pass from the collision start, and time t5 is a time point at which 50 msec pass from the collision start. Further, for example, the period T1 is a period during which an elapsed time from the collision start is from 28 msec to 50 msec, and the period T2 is a period during which the elapsed time from the collision start is from 28 msec to 36 msec.

Effects

In the present embodiment, as described above, the bracket 9 is attached to the striker 8 for the rear side door 2, the bracket 9 is provided with the bar portion 92d, and the hole portion 65a is provided in the roof side outer reinforcement 6. Accordingly, at the time of a side collision, the bar portion 92d is engaged with the hole portion 65a, so that a collision load input into the rear side door 2 is transmitted to the roof side outer reinforcement 6 via the bracket 9, thereby making it possible to restrain the rear side door 2 from entering the cabin. Further, since the bracket 9 is not joined to the roof side outer reinforcement 6, it is possible to suppress such a situation that a high dimension accuracy is demanded. As a result, it is possible to suppress such a situation that a high dimension accuracy is demanded and to restrain the rear side door 2 from entering the cabin at the time of a side collision.

Further, in the present embodiment, since the bar portion 92d is inserted into the hole portion 65a, the bar portion 92d can be appropriately engaged with the hole portion 65a at the time of a side collision. Further, in a case where the bar portion 92d is not inserted into the hole portion 65a at the time of assembling of the side outer panel 7, the bar portion 92d interferes with the roof side outer reinforcement 6, so that the side outer panel 7 is raised. As a result, the side outer panel 7 cannot be assembled. This accordingly can promote the side outer panel 7 to be assembled in an appropriate state where the bar portion 92d is inserted into the hole portion 65a.

Further, in the present embodiment, since the bar portion 92d is distanced from the hole portion 65a, it is possible to suppress such a situation that the bar portion 92d makes contact with the hole portion 65a during vehicle running, thereby making it possible to restrain occurrence of abnormal noise. Further, the bar portion 92d is easily inserted into the hole portion 65a, so that it is possible to easily perform an assembling operation of the side outer panel 7. Further, by adjusting the distance D between the bar portion 92d and the hole portion 65a, it is possible to adjust the timing when the vertical wall 21b in the rear end of the rear side door 2 is pulled rearward in the vehicle front-rear direction at the time of a side collision. Further, when the distance D is set so that the vertical wall 21b is pulled rearward in the vehicle front-rear direction at time t3, it is possible to restrain the rear side door 2 from entering the cabin during the period T2. Here, it is conceivable that the rear side door is restrained from entering the cabin by increasing the offset yield strengths of a belt line reinforcement and an impact beam of the rear side door and by increasing the offset yield strength of a door opening as their landing point. However, in a case where an entry restraining effect equivalent to the present embodiment is to be obtained by this technique, a weight increases. For example, the weight of a structural portion functioning at the time of a side collision is around 1.2 kg in the present embodiment, whereas the weight is increased by about 4.2 kg in a case where an effect equivalent to the present embodiment is to be obtained by a technique to increase the offset yield strengths of the belt line reinforcement, the impact beam, and their landing point. That is, in the present embodiment, it is possible to restrain the rear side door 2 from entering the cabin while the increase in weight is restrained.

Further, in the present embodiment, the bracket 9 is provided with the rod 92 and the rod 92 includes the bar portion 92d, so that a collision load at the time of a side collision can be transmitted appropriately by the rod 92.

Further, in the present embodiment, the bracket 9 includes the face portion 9b to which the striker 8 is attached and the face portion 9c extending rearward in the vehicle front-rear direction from the face portion 9b, and the rod 92 is attached to the face portions 9b and 9c. Hereby, at the time of a side collision, it is possible to suppress such a situation that the bracket 9 deforms so that an angle between the face portion 9b and the face portion 9c changes. That is, it is possible to restrain the bracket 9 from bending at the boundary portion between the face portions 9b and 9c. This makes it possible to restrain an increase of an entry amount of the rear side door 2 due to the deformation of the bracket 9.

Further, in the present embodiment, the burring portion 65b is formed around the hole portion 65a, thereby making it possible to restrain the hole portion 65a from deforming at the time of a side collision.

Further, in the present embodiment, the reinforcement patch 65 is provided around the hole portion 65a, so that a thickness around the hole portion 65a can be increased. Accordingly, it is possible to restrain the hole portion 65a from deforming at the time of a side collision. Further, it is possible to compensate a decrease in strength caused due to forming of the hole portion 64 in the roof side outer reinforcement 6.

Other Embodiments

It should be noted that the embodiment described herein is just an example in all respects and is not limitative. Accordingly, the technical scope of the disclosure is not interpreted only by the above embodiment but is defined based on the description in Claims. Further, the technical scope of the disclosure includes all modifications made within the meaning and scope equivalent to Claims.

For example, the above embodiment deals with an example in which the right and left vehicle side structures 50 are both provided with the structural portions functioning at the time of a side collision. However, the disclosure is not limited to this, and only either of the right and left vehicle side structures may be provided with the structural portion functioning at the time of a side collision.

Further, the above embodiment deals with an example in which the rod 92 is inserted into the hole portion 65a. However, the disclosure is not limited to this, and the rod may not be inserted into the hole portion in advance before a collision, provided that the rod is inserted into the hole portion so as to be engaged therewith at the time of a side collision.

Further, the above embodiment deals with an example in which the rod 92 is distanced from the hole portion 65a. However, the disclosure is not limited to this, and the rod may make contact with the hole portion.

Further, the above embodiment deals with an example in which the bracket 9 is provided with the rod 92. However, the disclosure is not limited to this, and the bracket may not be provided with the rod and the bracket may be inserted into the hole portion. In this case, the hole portion may be an elongated hole. With such a configuration, it is possible to increase a contact area between the bracket (the engaging portion) and the hole portion at the time of a side collision, thereby making it possible to disperse a collision load transmitted to the hole portion.

Figure 7:
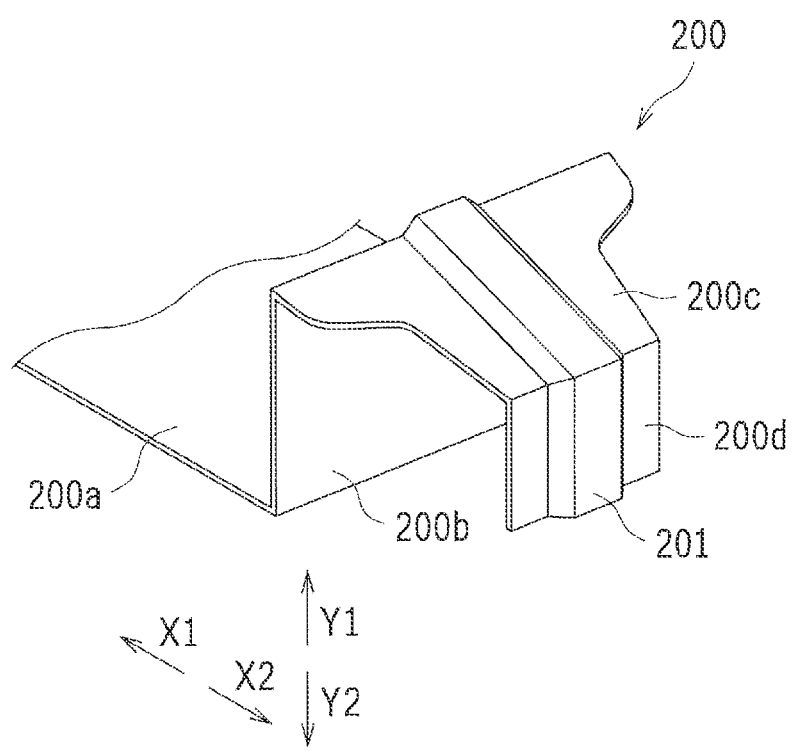
FIG. 7 is a perspective view to describe a bracket in a first modification.

For example, as illustrated in a first modification illustrated in FIG. 7, the bracket 200 may include face portions 200a to 200d. The face portion 200a is configured similarly to the face portion 9a described above. The face portion 200b is formed so as to extend outwardly (toward the Y1 side) in the vehicle width direction from a rear end (on the X2 side) of the face portion 200a in the vehicle front-rear direction, and a retainer for holding a striker is attached to the face portion 200b. The face portion 200c is formed in an outer end of the face portion 200b in the vehicle width direction so as to extend rearward in the vehicle front-rear direction. The face portion 200d is formed in a rear end of the face portion 200c in the vehicle front-rear direction so as to extend inwardly (toward the Y2 side) in the vehicle width direction. A bead portion 201 is formed in the face portions 200c and 200d. The bead portion 201 is formed so as to project outwardly in the vehicle width direction from the face portion 200c and is also formed so as to extend in the vehicle front-rear direction (toward the X1 and X2 sides) in the face portion 200c. Further, the bead portion 201 is formed so as to project rearward in the vehicle front-rear direction from the face portion 200d and is also formed so as to extend in the vehicle width direction (toward the Y1 and Y2 sides) in the face portion 200d. The face portion 200d is inserted into the hole portion of the roof side outer reinforcement. By forming the bead portion 201 as such, it is possible to improve strength of the face portions 200c and 200d, thereby making it possible to restrain the bracket 200 from deforming at the time of a side collision. Note that the face portions 200b and 200c are examples of a "first face portion" and a "second face portion" in the disclosure, respectively. The face portion 200d is one example of a "third face portion," an "engaging portion," and a "projection" in the disclosure.

Figure 8:
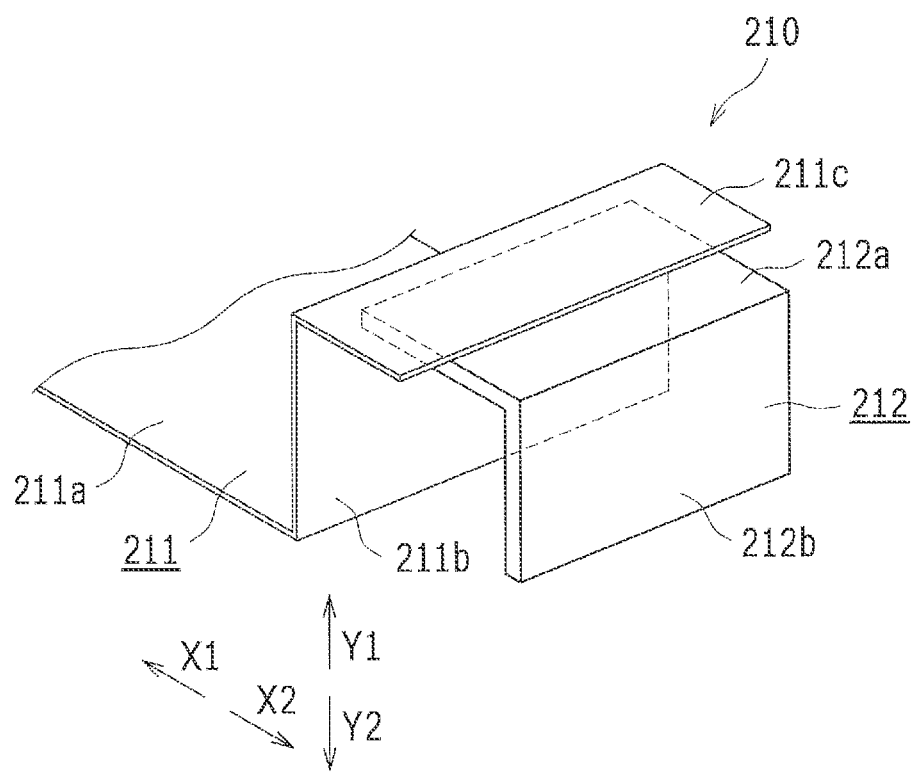
FIG. 8 is a perspective view to describe a bracket in a second modification.

Further, as illustrated in a second modification illustrated in FIG. 8, a bracket 210 may be constituted by two plate materials 211 and 212. The plate material 212 has a thickness thicker than a thickness of the plate material 211. For example, the thickness of the plate material 211 is 1.2 mm and the thickness of the plate material 212 is 8 mm. The plate material 211 is formed in a generally Z-shape and includes three face portions 211a to 211c. The plate material 212 is formed in a generally L-shape and includes two face portions 212a and 212b. The face portion 211a is configured similarly to the face portion 9a described above. The face portion 211b is formed so as to extend outwardly (toward the Y1 side) in the vehicle width direction from a rear end (on the X2 side) of the face portion 211a in the vehicle front-rear direction, and a retainer for holding a striker is attached to the face portion 211b. The face portion 211c is formed in an outer end of the face portion 211b in the vehicle width direction so as to extend rearward in the vehicle front-rear direction. The face portion 212a is formed so as to extend in the vehicle front-rear direction (toward the X1 and X2 sides) and is joined to the face portion 211c. The face portion 212b is formed in a rear end of the face portion 212a in the vehicle front-rear direction so as to extend inwardly (toward the Y2 side) in the vehicle width direction. The face portion 212b is inserted into the hole portion of the roof side outer reinforcement. With such a configuration, it is possible to restrain an increase in weight of the bracket 210 and to improve strength of the face portion 212b inserted into the hole portion, thereby making it possible to restrain the bracket 210 from deforming at the time of a side collision. Note that a bead portion may be formed in the plate material 212. Further, the plate materials 211 and 212 are examples of a "first plate material" and a "second plate material" in the disclosure, respectively. The face portion 211b is one example of a "first face portion" in the disclosure. The face portions 211c and 212a are examples of a "second face portion" in the disclosure. The face portion 212b is one example of a "third face portion," an "engaging portion," and a "projection" in the disclosure.

Further, the above embodiment deals with an example in which the reinforcement patch 65 is provided around the whole circumference of the hole portion 65a. However, the disclosure is not limited to this, and the reinforcement patch may not be provided, or the reinforcement patch may be provided only in a part of the circumference of the hole portion.

Further, the above embodiment deals with an example in which the burring portion 65b is formed in the reinforcement patch 65 and no burring portion is formed in the roof side outer reinforcement 6. However, the disclosure is not limited to this, and a burring portion may be formed in the roof side outer reinforcement and no burring portion may be formed in the reinforcement patch. Further, burring portions may be formed both in the roof side outer reinforcement and the reinforcement patch, or no burring portion may be formed both in the roof side outer reinforcement and the reinforcement patch.

Figure 9:
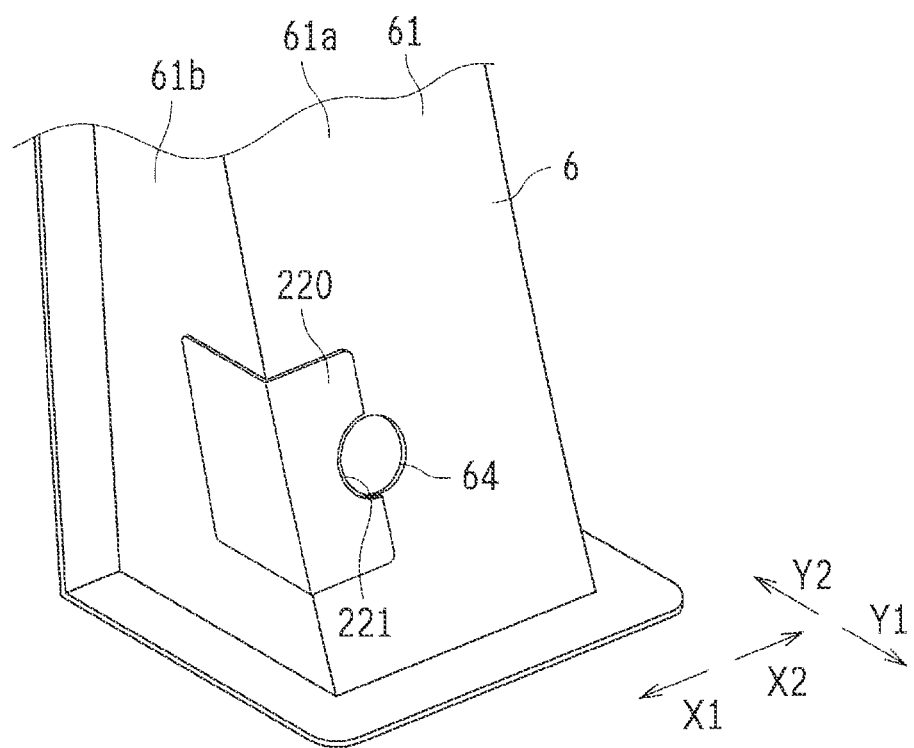
FIG. 9 is a perspective view to describe a reinforcement patch in a third modification.

For example, as illustrated in a third modification illustrated in FIG. 9, a reinforcement patch 220 may be provided only in a part of the circumference of the hole portion 64 of the roof side outer reinforcement 6. The reinforcement patch 220 is formed in an L-shape and is joined to the side face 61a and the front face 61b of the roof side outer reinforcement 6. An arcuate notch portion 221 is formed in the reinforcement patch 220, and the hole portion 64 is placed in the notch portion 221. That is, the reinforcement patch 220 is provided in only a half of a front side (the X1 side), in the vehicle front-rear direction, of the circumference of the hole portion 64. A distance from a front end of the side face 61a in the vehicle front-rear direction to the hole portion 64 is around 10 mm, for example. Note that no burring portion is formed in the roof side outer reinforcement 6 and the reinforcement patch 220, but a burring portion may be formed in at least either one of the roof side outer reinforcement 6 and the reinforcement patch 220. Further, the hole portion 64 is one example of an "engaged portion" in the disclosure.

Figure 10:
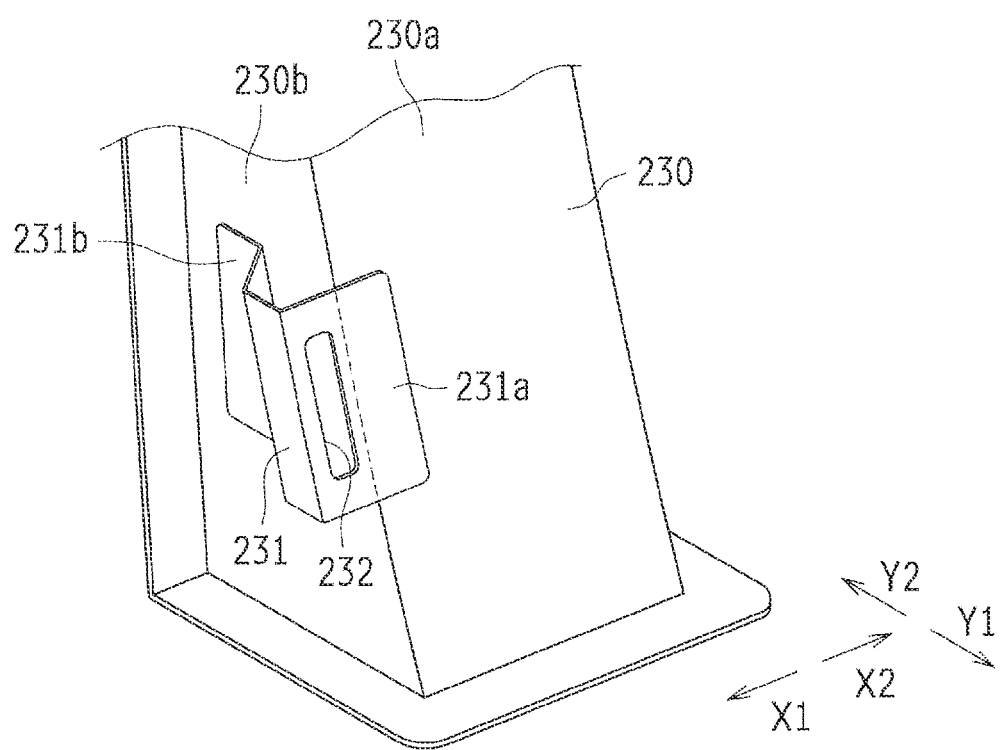
FIG. 10 is a perspective view to describe a roof side outer reinforcement provided with an extension in a fourth modification.

Further, the above embodiment deals with an example in which the hole portion 65a is provided in the roof side outer reinforcement 6. However, the disclosure is not limited to this, and like a roof side outer reinforcement 230 in a fourth modification illustrated in FIG. 10, an extension 231 having a hole portion 232 may be provided. A hole portion functioning as an engaged portion is not formed in the roof side outer reinforcement 230. The extension 231 is a separated portion from the roof side outer reinforcement 230 and is placed in front of (on the X1 side from) the roof side outer reinforcement 230 in the vehicle front-rear direction. A first end 231a of the extension 231 is joined to a side face 230a of the roof side outer reinforcement 230, and a second end 231b of the extension 231 is joined to a front face 230b of the roof side outer reinforcement 230. The hole portion 232 is formed on a surface extending forward in the vehicle front-rear direction from the side face 230a of the extension 231. The projection of the bracket is inserted into the hole portion 232. With such a configuration, it is possible to restrain a decrease in strength of the roof side outer reinforcement 230 and to provide the hole portion 232 in the roof side outer reinforcement 230. Further, it is possible to shorten the length of the bracket or the rod in the vehicle front-rear direction. Note that a burring portion or a reinforcement patch may be formed around the hole portion 232. Further, the roof side outer reinforcement 230 is one example of a "reinforcement" in the disclosure, and the hole portion 232 is one example of an "engaged portion" in the disclosure.

Further, the above embodiment deals with an example in which the special hole portion 65a into which the rod 92 is inserted is provided. However, the disclosure is not limited to this, and in a case where a hole portion for joining is formed in the roof side outer reinforcement, the rod may be inserted into this hole portion. In such a configuration, it is not necessary to form a special hole portion into which the rod is inserted, thereby making it possible to restrain a decrease in strength of the roof side outer reinforcement.

Further, the above embodiment deals with an example in which the rod 92 has a circular section. However, the disclosure is not limited to this, and the sectional shape of the rod may be a polygonal shape and the like. Similarly, the above embodiment deals with an example in which the hole portion 65a is circular. However, the disclosure is not limited to this, and the hole portion may have a polygonal shape and the like.

Further, the above embodiment deals with an example in which the hole portion 65a is provided in the roof side outer reinforcement 6 and the rod 92 inserted into the hole portion 65a is provided in the bracket 9. However, the disclosure is not limited to this, and a hole portion may be provided in the bracket and a projection inserted into the hole portion may be provided in the roof side outer reinforcement.

Figure 11:
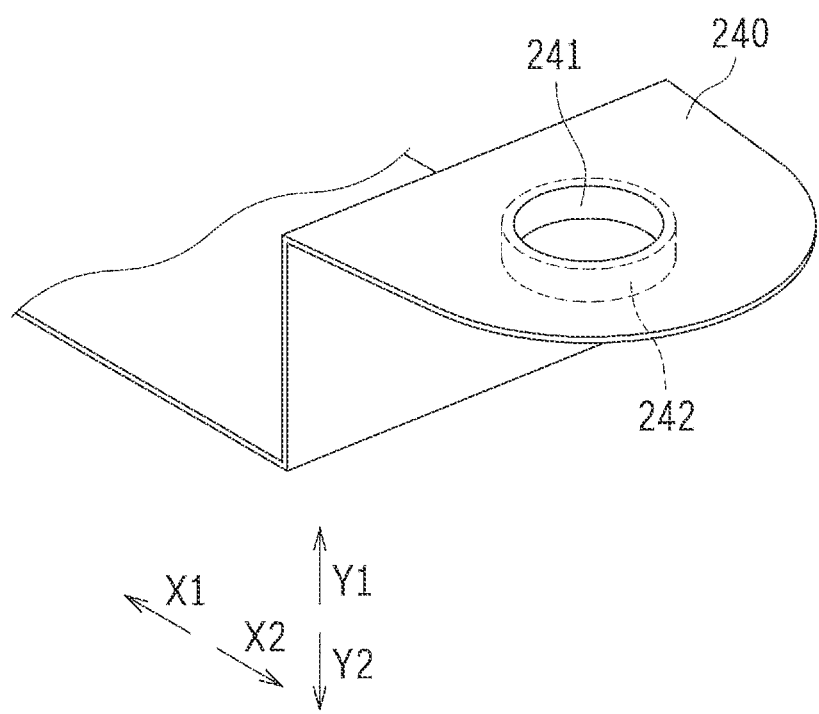
FIG. 11 is a perspective view to describe a bracket in a fifth modification.

For example, as illustrated in a fifth modification illustrated in FIG. 11, a hole portion 241 may be formed in a bracket 240. The hole portion 241 is circular and a burring portion 242 is formed around the hole portion 241. A projection provided in the roof side outer reinforcement is inserted into the hole portion 241. Note that the hole portion 241 may be an elongated hole and the burring portion 242 may not be formed. A reinforcement patch may be provided around the hole portion 241. Further, the hole portion 241 is one example of an "engaging portion" in the disclosure.

Figure 12:
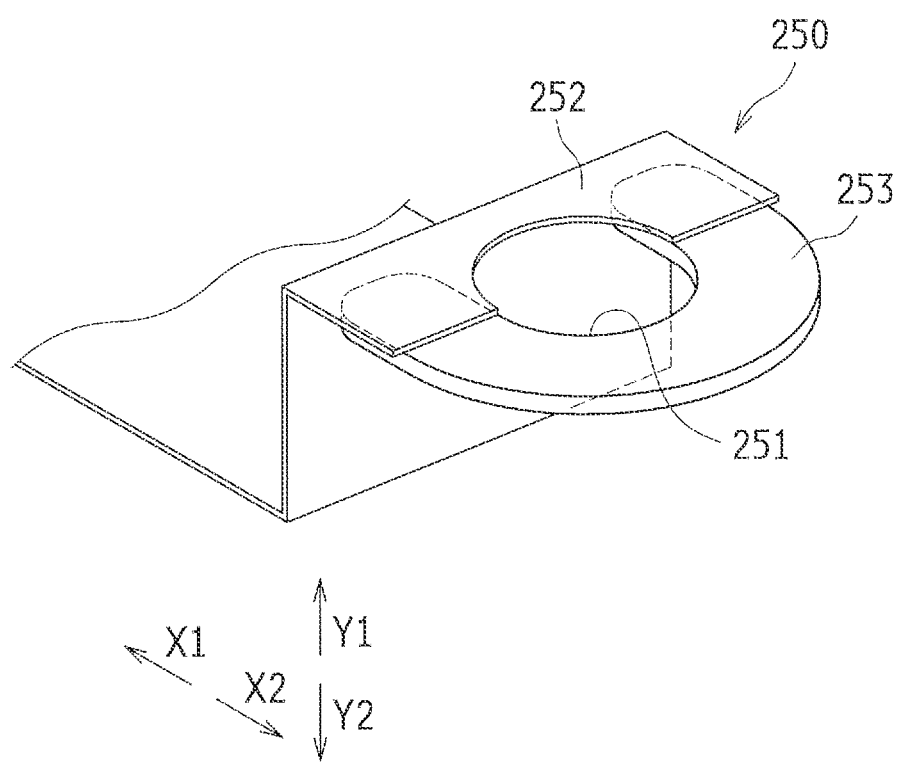
FIG. 12 is a perspective view to describe a bracket in a sixth modification.

Further, as illustrated in a sixth modification illustrated in FIG. 12, a hole portion 251 may be formed in a bracket 250 and the bracket 250 may be constituted by two plate materials 252 and 253. The plate material 253 has a thickness thicker than a thickness of the plate material 252. For example, the thickness of the plate material 252 is 1.2 mm and the thickness of the plate material 253 is 8 mm. The hole portion 251 is circular and is constituted by the plate materials 252 and 253 having different thicknesses. The plate material 253 is placed rearward (on the X2 side) in the vehicle front-rear direction from the plate material 252. A projection provided in the roof side outer reinforcement is inserted into the hole portion 251. At the time of a side collision, the plate material 253 makes contact with the projection of the roof side outer reinforcement. Note that the hole portion 251 may be an elongated hole and a burring portion may be formed therein. Further, the hole portion 251 is one example of an "engaging portion" in the disclosure.

Figure 13:
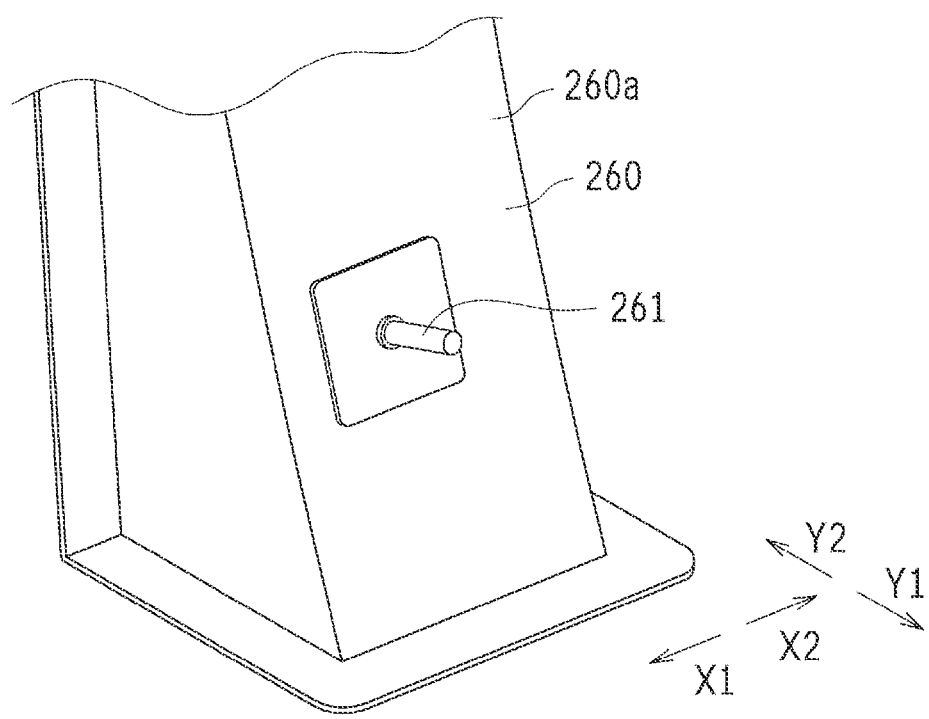
FIG. 13 is a perspective view to describe a roof side outer reinforcement in a seventh modification.

Further, as illustrated in a seventh modification illustrated in FIG. 13, a bar-shaped projection 261 may be provided in a roof side outer reinforcement 260. The projection 261 is formed so as to project outwardly (toward the Y1 side) in the vehicle width direction from a side face 260a of the roof side outer reinforcement 260. The projection 261 is inserted into a hole portion provided in the bracket. With such a configuration, it is not necessary to form a hole portion in the roof side outer reinforcement 260, thereby making it possible to restrain a decrease in strength of the roof side outer reinforcement 260. Note that the roof side outer reinforcement 260 is one example of a "reinforcement" in the disclosure, and the projection 261 is one example of an "engaged portion" in the disclosure.

Figure 14:
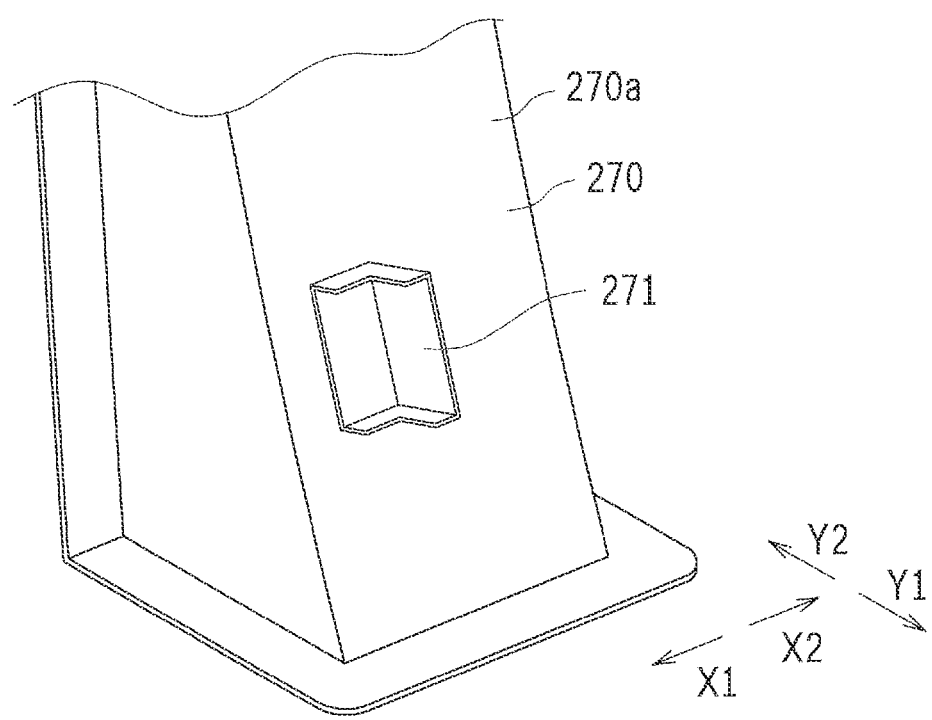
FIG. 14 is a perspective view to describe a roof side outer reinforcement in an eighth modification.

Further, as illustrated in an eighth modification illustrated in FIG. 14, a plate-shaped projection 271 may be provided in a roof side outer reinforcement 270. The projection 271 is formed so as to project outwardly (toward the Y1 side) in the vehicle width direction from a side face 270a of the roof side outer reinforcement 270. The projection 271 is inserted into a hole portion provided in the bracket. With such a configuration, it is not necessary to form a hole portion in the roof side outer reinforcement 270, thereby making it possible to restrain a decrease in strength of the roof side outer reinforcement 270. Note that the roof side outer reinforcement 270 is one example of a "reinforcement" in the disclosure, and the projection 271 is one example of an "engaged portion" in the disclosure.

Further, in the above embodiment, a part of the flange portion 62 on the front side of the roof side outer reinforcement 6 in the vehicle front-rear direction may be extended to the rear side door opening 2a.

Further, in the above embodiment, a foam material that is not illustrated herein may be sandwiched between members (e.g., between the roof side outer reinforcement and the reinforcement patch).

The first embodiment of the disclosure is applicable to a vehicle side structure including a reinforcement extending upward from a rear wheel well.

What is claimed is:
1. A vehicle side structure comprising:
   a reinforcement extending upward from a rear wheel well, the reinforcement being provided with an engaged portion;
   a side outer panel placed outward of the rear wheel well and the reinforcement in a vehicle width direction;
   a striker placed on an outer side of the side outer panel so as to lock a rear side door; and
   a bracket placed inside the side outer panel such that the striker is attached to the bracket, the bracket being provided with an engaging portion configured to engage with the engaged portion, wherein:
   one of the engaging portion and the engaged portion is a projection extending in the vehicle width direction;
   the other one of the engaging portion and the engaged portion is a hole portion; and
   the projection is inserted into the hole portion.

2. The vehicle side structure according to claim 1, wherein the projection is distanced from the hole portion.

3. The vehicle side structure according to claim 1, wherein:
   the bracket is provided with a rod;
   the hole portion is provided in the reinforcement;
   a front side of the rod in a vehicle front-rear direction is attached to the bracket; and
   a rear side of the rod in the vehicle front-rear direction is inserted into the hole portion.

4. The vehicle side structure according to claim 3, wherein:
   the bracket includes a first face portion to which the striker is attached and a second face portion extending rearward in the vehicle front-rear direction from the first face portion; and
   the rod is attached to the first face portion and the second face portion.

5. The vehicle side structure according to claim 1, wherein:
   the bracket includes a first face portion to which the striker is attached, a second face portion extending rearward in a vehicle front-rear direction from the first face portion, and a third face portion extending inwardly in the vehicle width direction from the second face portion; and
   the reinforcement is provided with the hole portion into which the third face portion is inserted.

6. The vehicle side structure according to claim 5, wherein a bead portion is formed in the second face portion and the third face portion.

7. The vehicle side structure according to claim 5, wherein:
  the bracket includes a first plate material, and a second plate material having a thickness thicker than a thickness of the first plate material;
  the first face portion and the second face portion are made of the first plate material; and
  the second face portion and the third face portion are made of the second plate material.

8. The vehicle side structure according to claim 1, wherein:
  the reinforcement is provided with an extension that is a separate portion from the reinforcement; and
  the hole portion is provided in the extension.

9. The vehicle side structure according to claim 1, wherein:
  the hole portion is provided in the bracket; and
  the projection is provided in the reinforcement.

10. The vehicle side structure according to claim 1, wherein a burring portion is formed around the hole portion.

11. The vehicle side structure according to claim 1, wherein a reinforcement patch is provided around the hole portion.

12. The vehicle side structure according to claim 1, wherein the engaging portion is configured to engage with the engaged portion at a time of a side collision.

* * * * *